(12) United States Patent
Winkelvos et al.

(10) Patent No.: US 12,255,985 B2
(45) Date of Patent: Mar. 18, 2025

(54) METHOD FOR AUTHENTIC DATA TRANSMISSION BETWEEN CONTROL DEVICES OF A VEHICLE, ARRANGEMENT WITH CONTROL DEVICES, COMPUTER PROGRAM, AND VEHICLE

(71) Applicant: Volkswagen Aktiengesellschaft, Wolfsburg (DE)

(72) Inventors: Timo Winkelvos, Sickte (DE); Aljoscha Fernandez, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 385 days.

(21) Appl. No.: 17/881,168

(22) Filed: Aug. 4, 2022

(65) Prior Publication Data

US 2023/0052852 A1   Feb. 16, 2023

(30) Foreign Application Priority Data

Aug. 4, 2021   (DE) ..................... 10 2021 208 459.1

(51) Int. Cl.
*H04L 9/08* (2006.01)
*H04L 9/40* (2022.01)
*H04W 12/06* (2021.01)

(52) U.S. Cl.
CPC ............ *H04L 9/0819* (2013.01); *H04L 63/18* (2013.01); *H04W 12/06* (2013.01)

(58) Field of Classification Search
CPC ......... H04L 9/0819; H04L 63/18; H04L 9/14; H04W 12/06; H04W 4/48
See application file for complete search history.

(56) References Cited

U.S. PATENT DOCUMENTS 10,043,329 B2 *   8/2018   Murray .................. H04K 3/226
10,501,055 B1 *  12/2019   Yi .......................... G06Q 50/40
(Continued)

FOREIGN PATENT DOCUMENTS

CN   109218266 A     1/2019  ............... G07C 5/08
DE   102013108006 A1 *  1/2015  ....... H04L 12/40013
(Continued)

OTHER PUBLICATIONS

German Office Action, Application No. 102021208459.1, 12 pages, Apr. 6, 2022.

*Primary Examiner* — Venkat Perungavoor
*Assistant Examiner* — Peiliang Pan
(74) *Attorney, Agent, or Firm* — Slayden Grubert Beard PLLC

(57) ABSTRACT

A method is disclosed for authentic data transmission between control devices of a vehicle in which messages which are sent from a first control device to a receiver control device and are provided with a first cryptographic key for authentication, and messages that are sent from a second control device to the receiver control device are provided with a second cryptographic key for authentication. First status information provided with a third cryptographic key is sent from a monitoring module of the first control device to the receiver control device and second status information provided with the second cryptographic key is sent from the second control device to the receiver control device. The first status information and second status information are received by the receiver control device. The received first and second status information is evaluated to detect a manipulation of the first control device.

17 Claims, 4 Drawing Sheets

(56) References Cited

U.S. PATENT DOCUMENTS

| | | | |
|---|---|---|---|
| 10,991,175 B2 * | 4/2021 | Zhang | H04L 63/062 |
| 11,377,072 B2 * | 7/2022 | Wood | H04L 9/0897 |
| 11,556,633 B2 * | 1/2023 | Mukherjee | G06F 21/53 |
| 11,691,597 B2 * | 7/2023 | Moeller | B60R 25/31 |
| | | | 340/426.1 |
| 2016/0306966 A1 | 10/2016 | Srivastava et al. | 713/168 |
| 2017/0126745 A1 * | 5/2017 | Taylor | H04L 63/0227 |
| 2020/0101981 A1 | 4/2020 | Phillips et al. | |
| 2020/0313908 A1 | 10/2020 | Mondello et al. | |
| 2022/0009353 A1 | 1/2022 | Hess et al. | |
| 2023/0034996 A1 * | 2/2023 | Peng | H04W 12/106 |

FOREIGN PATENT DOCUMENTS

| | | | |
|---|---|---|---|
| DE | 102013214018 A1 | 1/2015 | H04L 9/32 |
| DE | 102019202527 A1 * | 8/2020 | B60L 3/0038 |
| EP | 3503044 A1 | 6/2019 | B60R 25/24 |

* cited by examiner

METHOD FOR AUTHENTIC DATA TRANSMISSION BETWEEN CONTROL DEVICES OF A VEHICLE, ARRANGEMENT WITH CONTROL DEVICES, COMPUTER PROGRAM, AND VEHICLE

CROSS-REFERENCE TO RELATED APPLICATIONS

This application claims priority to German Patent Application No. DE 10 2021 208 459.1, filed on Aug. 4, 2021 with the German Patent and Trademark Office. The contents of the aforesaid Patent Application are incorporated herein for all purposes.

TECHNICAL FIELD

The present invention relates to a method for authentic data transmission between control devices of a vehicle. The invention also relates to an arrangement with control devices which execute a corresponding method, a computer program for executing the method, and a vehicle with such an arrangement.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The increasing degree of automation in vehicles enables the driver to be increasingly unburdened. Thus, in highly automated driving, safety-related vehicle functions may be controlled by the vehicles themselves but must therefore also be protected from disturbances and failures as perfectly as possible. For example, the control devices of actuator systems for the steering, gas pedal, and brake as well as the environment sensors represent critical system components that must be secured accordingly. For this reason, redundancy systems are provided in vehicles for such system components, which redundancy systems may assume the safety-related functions sufficiently well in the case of problems in order to continue to control the vehicle safely even without human intervention and to prevent danger to the occupants.

Due to the increasing connectivity of vehicles, this may be of great importance. Wireless communication enables, on the one hand, an exchange of information in real time between vehicles as well as between infrastructure and vehicles, updates via radio, or internet access for entertainment systems in the vehicle. On the other hand, access to the vehicle's internal network being possible wirelessly from the outside creates a potential entry point for cyberattacks, since the interfaces provided for this purpose may have security gaps. This means there is a danger of these security gaps being used to manipulate individual vehicles or even entire vehicle fleets from the outside and possibly to remotely control them against the will of the driver of the vehicle in question. For this reason, the cybersecurity of the software and hardware used in the automotive sector is taking on an ever greater significance.

In this case, for example the control devices of the vehicles, of which a plurality are installed in today's vehicles, also represent a potential vulnerability, since they each comprise their own software and are connected to each other but do not have sufficient computing capacity for comprehensive encryption. For the communication of multiple control devices with each other, authentication may therefore be provided, which enables a receiving control device in principle to check whether the sender of a signed message is actually the control device that it claims to be.

But even when using such authentication methods there is a danger that it may be undermined by what are known as spoofing methods. In this case, if a safety-related system component is taken over by an attacker, the behavior of this system component may be manipulated so that the vehicle cannot detect that it must switch to the redundancy system.

SUMMARY

A need exists to provide an improved method for authentic data transmission between control devices of a vehicle, an arrangement with control devices that execute a corresponding method, a corresponding computer program, and a corresponding vehicle.

The need is addressed by the subject matter of the independent claims. Some embodiments are the subject matter of the dependent claims, the following description, and the drawings.

DESCRIPTION

Figure 1:
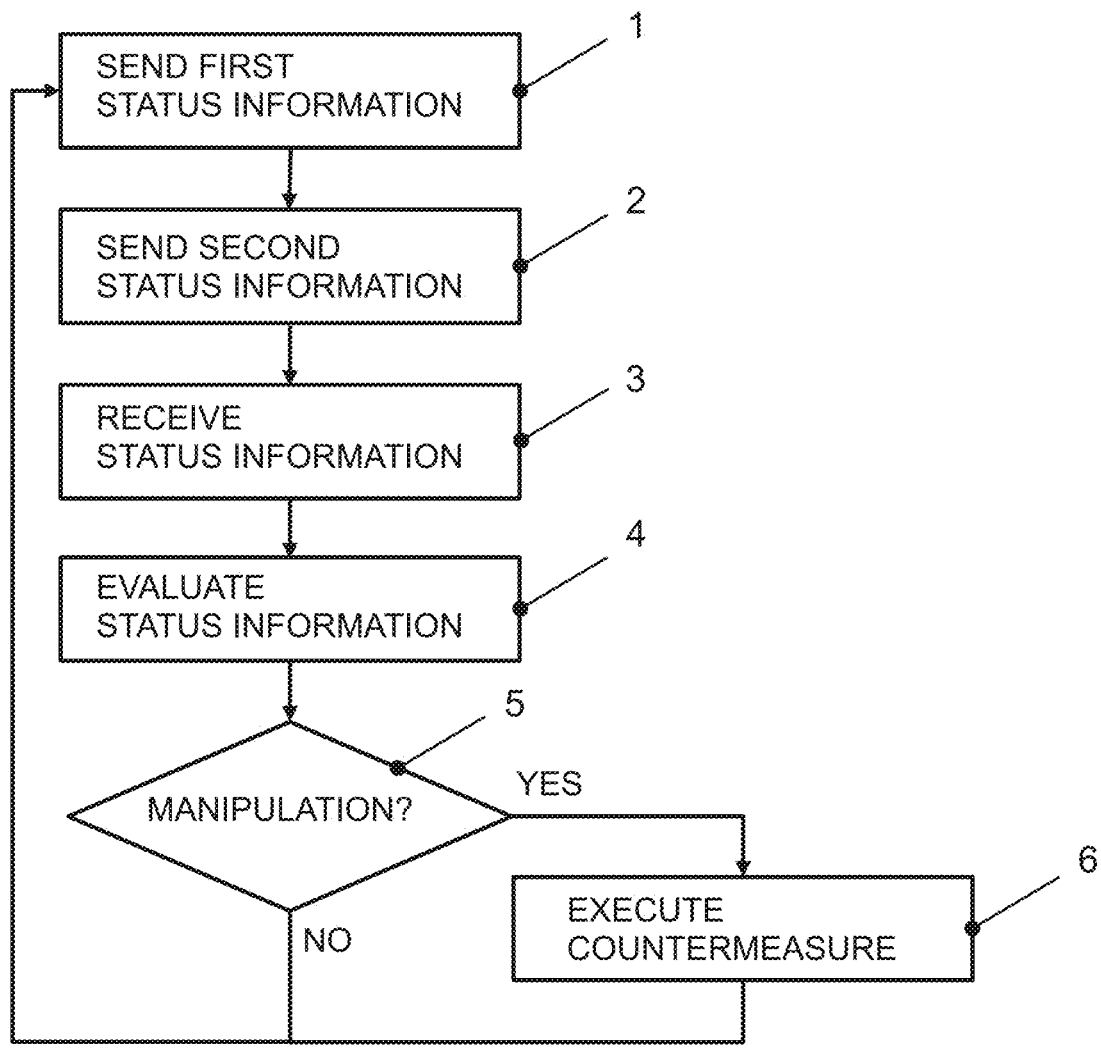
FIG. 1 schematically shows an embodiment for a method for authentic data transmission between control devices of a vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, in a method for authentic data transmission between control devices of a vehicle messages which are sent from a first control device serving as a main data source to a receiver control device are provided with a first cryptographic key for authentication, and messages which are sent from a second control device serving as a redundant data source to the receiver control device are provided with a second cryptographic key for authentication. The method comprises:

Sending first status information provided with a third cryptographic key from a monitoring module of the first control device to the receiver control device;

Sending second status information provided with the second cryptographic key from the second control device to the receiver control device;

Receiving the first status information and the second status information by the receiver control device;

Evaluating the received first and second status information to detect a manipulation of the first control device; and Taking a countermeasure when a manipulation of the first control device is detected.

In this way, the method makes it possible to ensure that if a manipulation is detected, information in this regard is present in the group of the control devices despite the possibility of a possible attacker influencing it, so that the manipulation may be responded to. This is a benefit for example during automated driving compared to manipulation detection mechanisms at the chip level, which are provided by chip manufacturers for some electronic chips, since these are limited locally to the respective chip and thus do not enable a systematic handling in the context of an automotive system group. Compared to conventional redundancy systems for automated driving, however, the teachings herein also enables manipulations to be detected when they extend beyond the failure of individual chips or respectively subsystems of the system group, and to then react to this with the appropriate countermeasure.

For example, the first status information may beneficially be generated by the monitoring module based on a monitoring of the first control device with regard to erroneous functions and/or manipulation attempts and be sent regularly to the receiver control device.

The second status information may also beneficially be generated by the second control device based on vehicle parameters and be sent regularly to the receiver control device.

The vehicle parameters may for example relate to a parameter for longitudinal control and/or transverse control of the vehicle.

In some embodiments, the monitoring module and the first control device are arranged on a common electronics board but have separate access to cryptographic keys and/or cryptography resources.

For example, the monitoring module may change the use of the cryptographic key for the first control device when a manipulation of the first control device is detected.

According to some embodiments, the first control device may be refused access to cryptographic keys by the monitoring module.

Furthermore, in some embodiments, the access of the first control device to cryptographic keys may be diverted by the monitoring module to a cryptographic key that is different from the first cryptographic key.

In some embodiments, the receiver control device detects, based on a message, which is provided with the cryptographic key that is different from the first cryptographic key, of the first control device that a manipulation has been detected by the monitoring module.

In some embodiments, the second control device serving as a redundant data source comprises a monitoring module, with which a manipulation of the second control device is detected.

In some embodiments, the monitoring module on the second control device may selectively filter out only safety-critical messages from the first control device in the case of a detected manipulation and continue to let safety-noncritical messages through.

In some embodiments, an arrangement comprises multiple control devices, which are connected to a common communication bus of the vehicle and are configured to execute one or more embodiments of the method of the teachings herein.

In some embodiments, at least one of the control devices has a monitoring module, which is arranged on a common electronics board with the at least one control device but has separate access to cryptographic keys and/or cryptography resources.

In some embodiments, a computer program comprises instructions that cause an arrangement with multiple control devices to execute one or more embodiments of the method of the teachings herein.

In some embodiments, a vehicle with an arrangement according to one or more embodiments is provided.

Further features of the present invention will become apparent from the following description and the claims in conjunction with the FIGS.

In order to better understand the principles of the present invention, further embodiments are discussed in greater detail below based on the FIGS. It should be understood that the invention is not limited to these embodiments and that the features described may also be combined or modified without departing from the scope and spirit of the invention.

Specific references to components, process steps, and other elements are not intended to be limiting. Further, it is understood that like parts bear the same or similar reference numerals when referring to alternate FIGS.

FIG. 1 schematically shows an exemplary embodiment of the method for authentic data transmission in a vehicle, for example a passenger car. The method enables for example a manipulation-secure authentication of a system group for automated driving when the vehicle is in a semi-autonomous or autonomous driving mode, but may also be used in a manual driving mode for assistance systems. In addition to a main system that executes or monitors one or more driving functions, a redundancy system is also provided here that is intended to assume the function of the main system if it should fail.

By way of example, the method is explained below using a redundant distributed system, in which a first control device serving as a main system or respectively main data source and a second control device serving as a redundancy system or respectively redundant data source each send messages with data to a receiver control device. The system group can, however, also comprise more than these three control devices.

The authentic data transmission between the control devices takes place here based on cryptographic keys. The cryptographic keys were generated, for example, during the production of the vehicle, written to the control devices through a secured transport channel, and are managed by a key management system. In this case, symmetrical keys are used which are thus used both on the transmitting side to sign the sent messages and on the receiving side to check the received messages.

In a method step 1, status information provided with its own cryptographic key of a monitoring module is sent to the receiver control device by the monitoring module, which may be implemented on the same circuit board or respectively the same electronics board as the first control device but has separate key and cryptography resource access. In this case, the status information is signed with its own cryptographic key by means of a cryptographic method known to the person skilled in the art.

In this case, the status information may be sent to the receiver control device for example at regular temporal intervals.

Furthermore, the status information may also possibly be sent to the redundancy system. What are known as tamper detection mechanisms of the electronic chips used, an intrusion detection system, a forensic module, or what is known as a watchdog function on the first control device may serve as a source for the status information.

In a method step 2, the second control device also sends data provided with its own cryptographic key to the receiver control device. This may also take place at regular temporal intervals, or in the case of certain events, such as the point in time of the actuation of a vehicle component or in the event of a change of a detected parameter by a specified amount.

In this case, the status information may for example be about the status of the vehicle, such as parameters for longitudinal control and/or transverse control of the vehicle. For example, the speed of the vehicle may be calculated and transmitted by the second control device completely independently from the first control device. In another example, the point in time of a braking action may be calculated by the second control device in parallel with the first control device so that the calculated information about the braking point in time should match the corresponding data in the first control device.

The status information sent from the monitoring module of the first control device and from the second control device is then received in a method step 3 by the receiver control device and evaluated in a following method step 4. The receiver control device may determine here in a method step 5, on the basis of the data, when a manipulation of the first control device could be present, because either direct indicators of an intervention have been measured by the monitoring module or because values calculated by the first and second control devices contradict each other.

In a method step 6, a countermeasure may then be taken when a manipulation of the first control device is detected. Depending on which indications of a manipulation are present, different response strategies may be defined here for each configuration. This may be described, for example, using a state machine, which represents both the signing and checking of the messages, the interpretation of same, and the response on the basis of the interpreted situation. An example of different states as configurable responses to the evaluation of the received messages may look as follows:

| State | Response |
|---|---|
| Z1 | Throttle speed continuously until standstill |
| Z2 | Drive with redundancy system only |
| Z3 | Respond only to actions of the longitudinal and transverse guidance of the driver, in this case assume values only from the redundancy system as information (speed) |
| Z4 | Ignore any messages from both systems and only trust raw values from the vehicle network (wheel rotational speed) |

Even if an attacker should now successfully have taken over control of the first control device and claims to be it, in order, for example, to then trigger an incorrect driving behavior, it would also have to simultaneously "spoof" the monitoring module and the second control device in relation to the receiver control device, meaning falsify messages of this additional communication partner to prevent an incorrect behavior from being identified. However, the attacker cannot achieve this due to the key model of the overall system and the separation of the access possibilities.

Instead, in the event of a deviation from the normal behavior, the attacker thus triggers another system state in the saved state machine, which may be determined by the receiver control device. The response is then initiated using the defined response configuration.

If the monitoring module is designed as a separate security module that is not also in danger from the takeover of the first control device, it may also change the key use for the first control device if a manipulation is detected. Thus, the key access may be refused so that the first control device may no longer send signed messages. The key access may also be diverted to another key, which the receiver control device may then detect and authenticate, but then not as an authentic, normal message from the first control device, but as a message from the first control device under the secondary condition that the monitoring module has determined a manipulation.

A monitoring module may also be implemented on the second control device to also be able to detect a manipulation on the second control device and respond to it. Such a monitoring module on the second control device may selectively filter out only safety-critical communication from the first control device in the case of a detected manipulation but continue to let noncritical communication through. As a result, additional security is attained without impairing most of the use cases with a false alarm.

Figure 2:
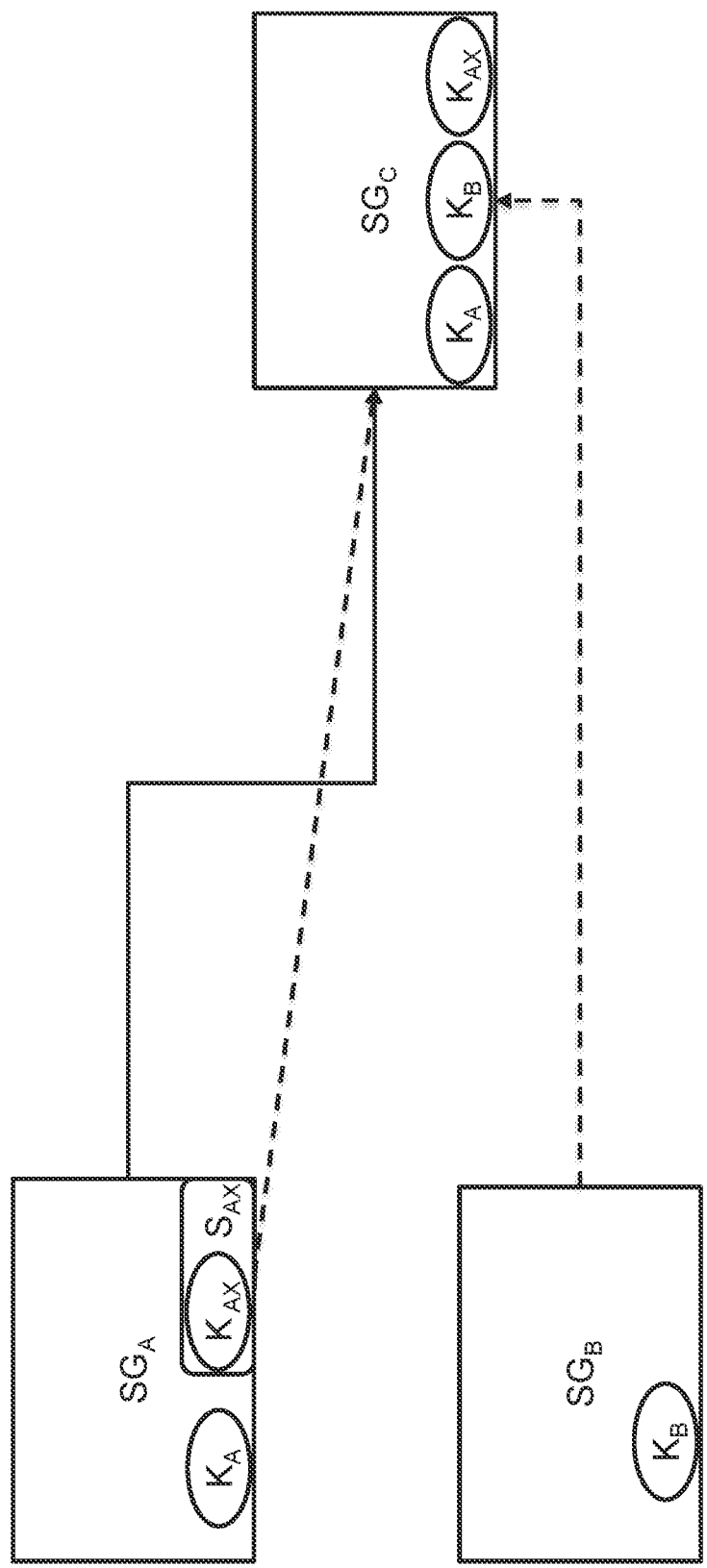
FIG. 2 schematically shows an embodiment with two control devices serving as a main data source and a redundant data source, which send authenticated messages to a receiver control device based on a first embodiment.

FIG. 2 schematically shows the method for authentic data transmission between control devices of a vehicle using three control devices. A first control device $SG_A$ serves here as a main data source, and a second control device $SG_B$ serves as a redundant data source. In this case, the two control devices each send authenticated messages with data to a receiver control device $SG_C$.

The first control device $SG_A$ has for this purpose a key $K_A$ and the second control device $SG_B$ has a key $K_B$, with which the messages are each signed during sending. Since a symmetrical method is used for the authentication of the communication in the vehicle, the receiver control device $SG_C$ accordingly has the same keys for checking the messages received by the control devices $SG_A$ and $SG_B$.

A monitoring module $S_{AX}$ of the first control device $SG_A$ is located in the same electronic assembly as the first control device, for example on the same electronics board. This may be implemented, for example, in that two controller chips are provided for the main data source and the monitoring module, which chips are arranged on the same circuit board. The monitoring module can, however, also be implemented as a virtual unit, which is then operated on the same processor as the main data source. In each case, the monitoring module $S_{AX}$ and the first control device have here, however, separate key and cryptography resource access.

With its own cryptographic key $K_{AX}$, as described above, the monitoring module $S_{AX}$ sends regular status information to the receiver control device $SG_C$, which also has access to the key $K_{AX}$. Using the evaluation described above of the status information received by the second control device $SG_B$ and the monitoring module, manipulation of the first control device is then detected and countermeasures are taken.

The control devices may be provided here for controlling any functionalities of a vehicle and may have a wide variety of functions and software applications for this purpose. They may comprise various modules, which are not shown in FIG. 2 for reasons of clarity. Thus, a function module may generate the data to be transmitted, for example based on signals from one or more vehicle sensors. The respective control devices also each have one or more cryptography modules, in order to be able to secure data and check the securing. These are for example designed as physical hardware security modules, on which the cryptographic keys are saved directly and protect and manage them. One or more communication modules are also provided in each case, by means of which the data may be sent and received via a vehicle-internal electronic network. In this case, the electronic network may be designed, for example, as a CAN, MOST, FlexRay, or Automotive Ethernet bus.

In this case, the communication of the first control device $SG_A$ and of the monitoring module $S_{AX}$ takes place via the same communication module and also the same vehicle-internal electronic network. However, it may also be provided that the communication of the first control device $SG_A$ takes place via a first communication module and a first vehicle-internal electronic network and the communication of the monitoring module $S_{AX}$ takes place via a second communication module and via a second vehicle-internal electronic network.

Finally, the data may be stored locally in a storage module, wherein a data distributor module for distributed storage and securing of the data may also be provided.

Figure 3:
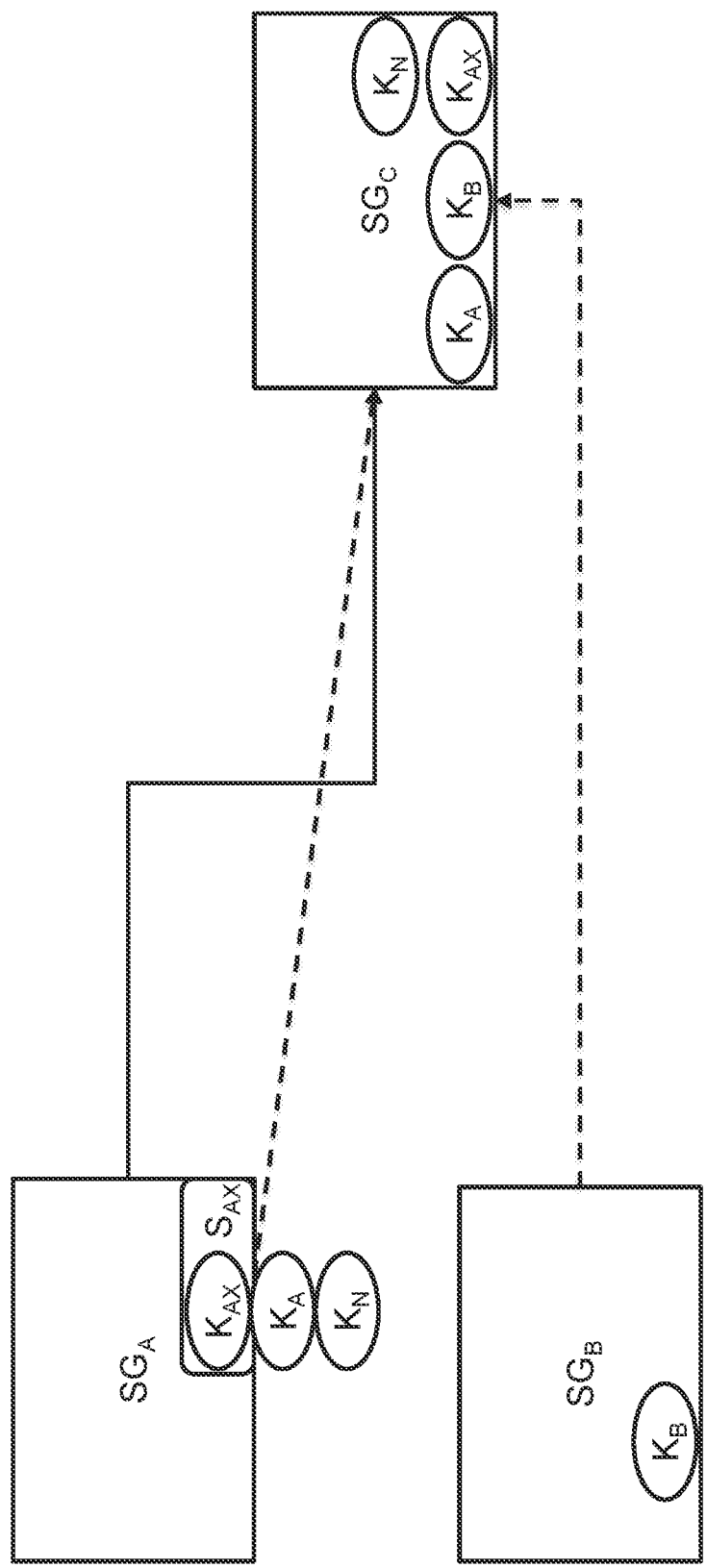
FIG. 3 schematically shows a second exemplary embodiment with a diversion of the key access.

FIG. 3 schematically shows a second exemplary embodiment, in which the key access of the control device serving as the main data source is diverted to another cryptographic key.

The communication between the second control device $SG_B$ and the receiver control device $SG_C$ takes place here as in the first exemplary embodiment. For the communication of the first control device, however, a switch may be made to an emergency key $K_N$. For this purpose, the monitoring module $S_{AX}$ decides on the basis of the occurrence of one or more predefined events that the communication should be executed via this emergency key $K_N$.

Figure 4:
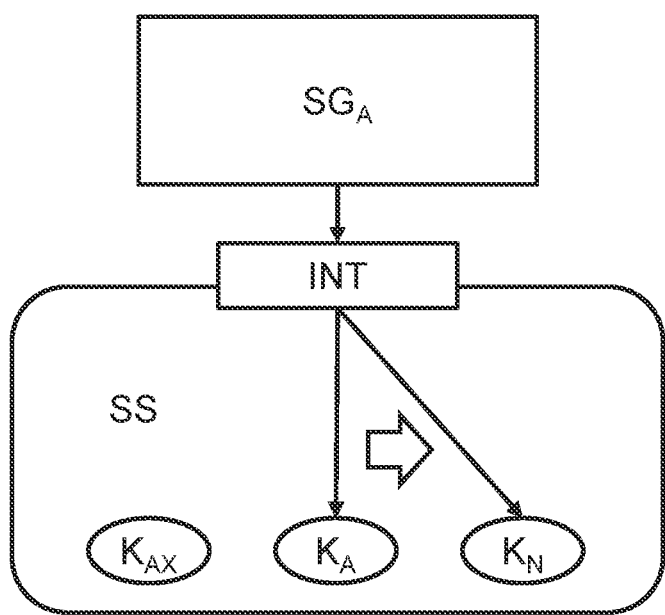
FIG. 4 schematically shows, for the second embodiment, how the key access of the control device serving as the main data source is diverted to another cryptographic key by the monitoring module.

FIG. 4 shows this diversion of the key access by the monitoring module. In this case, the first control device $SG_A$ serving as the main data source accesses the key storage SS of the monitoring module $S_{AX}$ through an interface INT, which storage is present as a separate security module and therefore is not in danger of being taken over as well in the event of a takeover of the first control device $SG_A$. In this case, by way of example, the keys $K_A$, $K_{AX}$ and the emergency key $K_N$ are located in the key storage SS. In the example shown, the communication between the first control device $SG_A$ serving as the main data source and the receiver control device $SG_C$ first takes place based on the key $K_A$. Due to the event detected by the monitoring module $S_{AX}$, it then decides, however, to switch to the emergency key $K_N$ for the communication between the first control device $SG_A$ and the receiver control device $SG_C$, as indicated schematically in the figure by the arrow pointing to the right.

The method is for example executed as a computer program on the control devices. For this purpose, the computer program is transmitted to a storage unit of the respective control device during the production of the control devices and stored. The computer program comprises instructions that, when executed by a processor of the control device, cause the control device to execute the steps of the method according to the teachings herein. The processor may comprise one or more processor units, for example microprocessors, digital signal processors, or a combination thereof.

LIST OF REFERENCE NUMERALS 1-6 Method steps
$SG_A$, $SG_B$, $SG_C$ Control device
$S_{AX}$ Monitoring module
$K_A$, $K_B$, $K_{AX}$, $K_N$ Cryptographic keys
INT Interface
SS Key storage The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "for example" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for authentic data transmission between control devices of a vehicle, in which messages which are sent from a first control device serving as a main data source to a receiver control device are provided with a first cryptographic key for authentication, and messages which are sent from a second control device serving as a redundant data source to the receiver control device are provided with a second cryptographic key for authentication, wherein the method comprises:
   sending first status information provided with a third cryptographic key from a monitoring module of the first control device to the receiver control device;
   sending second status information provided with the second cryptographic key from the second control device to the receiver control device;
   receiving the first status information and the second status information by the receiver control device;
   evaluating the received first and second status information to detect a manipulation of the first control device; and
   selectively taking a countermeasure, by the monitoring module, in case the manipulation of the first control device is detected, the countermeasure comprising redirecting an access to cryptographic keys of the first control device to a cryptographic key different from the first cryptographic key.

2. The method of claim 1, wherein the first status information is generated by the monitoring module based on a monitoring of the first control device with regard to erroneous functions and/or manipulation attempts and is sent regularly to the receiver control device.

3. The method of claim 2, wherein the second status information is generated by the second control device based on vehicle parameters and is sent regularly to the receiver control device.

4. The method of claim 3, wherein the vehicle parameters may relate to a parameter for longitudinal control and/or transverse control of the vehicle.

5. The method of claim 2, wherein the monitoring module and the first control device are arranged on a common electronics board but have separate access to cryptographic keys and/or cryptography resources.

6. The method of claim 1, wherein the second status information is generated by the second control device based on vehicle parameters and is sent regularly to the receiver control device.

7. The method of claim 6, wherein the vehicle parameters may relate to a parameter for longitudinal control and/or transverse control of the vehicle.

8. The method of claim 7, wherein the monitoring module and the first control device are arranged on a common electronics board but have separate access to cryptographic keys and/or cryptography resources.

9. The method of claim 6, wherein the monitoring module and the first control device are arranged on a common electronics board but have separate access to cryptographic keys and/or cryptography resources.

10. The method of claim 1, wherein the monitoring module and the first control device are arranged on a common electronics board but have separate access to cryptographic keys and/or cryptography resources.

11. The method of claim 1, wherein the receiver control device detects, based on the message, which is provided with the cryptographic key that is different from the first cryptographic key, of the first control device that a manipulation has been detected by the monitoring module.

12. The method of claim 1, wherein the second control device serving as a redundant data source comprises a monitoring module, with which a manipulation of the second control device is detected.

13. The method of claim 12, wherein the monitoring module on the second control device selectively filters out only safety-critical messages from the first control device in the case of a detected manipulation and continues to let safety-noncritical messages through.

14. An arrangement with multiple control devices, wherein the control devices are connected to a common communication bus of the vehicle and are configured to execute the method of claim 1.

15. The arrangement of claim 14, wherein at least one of the control devices has a monitoring module, which is arranged on a common electronics board with the at least one control device, but has separate access to cryptographic keys and/or cryptographic resources.

16. A non-transitory storage medium with instructions that cause an arrangement with multiple control devices to execute the steps of the method of claim 1.

17. A vehicle with the arrangement of claim 14.

* * * * *